(12) United States Patent
Sim et al.

(10) Patent No.: US 8,335,882 B2
(45) Date of Patent: Dec. 18, 2012

(54) DOCK FOR A PORTABLE HARD DISK AND A METHOD FOR ACCESSING CONTENT ON A HOST DEVICE USING THE DOCK

(75) Inventors: Wong Hoo Sim, Singapore (SG); Paul Pontin, Esher (GB); Simon Lee, Singapore (SG); Yew Teng Too, Singapore (SG)

(73) Assignee: Creative Technology Ltd, Singapore (SG)

( * ) Notice: Subject to any disclaimer, the term of this patent is extended or adjusted under 35 U.S.C. 154(b) by 502 days.

(21) Appl. No.: 12/698,068

(22) Filed: Feb. 1, 2010

(65) Prior Publication Data
US 2011/0191598 A1    Aug. 4, 2011

(51) Int. Cl.
*G06F 13/00* (2006.01)
(52) U.S. Cl. .......................... 710/303; 710/313
(58) Field of Classification Search .................. 710/300, 710/303, 304, 305, 313
See application file for complete search history.

(56) References Cited

U.S. PATENT DOCUMENTS

| | | | | |
|---|---|---|---|---|
| 5,805,412 A * | 9/1998 | Yanagisawa et al. | .... | 361/679.41 |
| 5,991,830 A * | 11/1999 | Beard et al. | ...................... | 710/18 |
| 6,195,718 B1 * | 2/2001 | Hennessy et al. | ............. | 710/304 |
| 6,493,783 B1 * | 12/2002 | Kinoshita et al. | ............. | 710/303 |
| 2003/0200370 A1 * | 10/2003 | Shoobe et al. | ................ | 710/303 |
| 2003/0221036 A1 * | 11/2003 | Konetski | ......................... | 710/303 |
| 2004/0066620 A1 * | 4/2004 | Grunow et al. | ................ | 361/686 |
| 2005/0185364 A1 * | 8/2005 | Bell et al. | ........................ | 361/679 |
| 2007/0043776 A1 * | 2/2007 | Senoo | ............................ | 707/200 |
| 2008/0183934 A1 * | 7/2008 | Starr et al. | ...................... | 710/303 |
| 2011/0185033 A1 * | 7/2011 | Reece | ............................ | 709/216 |

\* cited by examiner

*Primary Examiner* — Khanh Dang
(74) *Attorney, Agent, or Firm* — Creative Technology Ltd (57) ABSTRACT

There is provided a first dock for a portable hard disk, where the first dock is connectable to a host device. There is also provided a corresponding method for accessing content on the host device during use of the dock. It is advantageous that the host device is able to access content from portable hard disks that are docked with the first dock and a second dock.

32 Claims, 4 Drawing Sheets

DOCK FOR A PORTABLE HARD DISK AND A METHOD FOR ACCESSING CONTENT ON A HOST DEVICE USING THE DOCK

FIELD OF INVENTION

This invention relates to both an apparatus for docking a portable hard disk and a method to access content on a portable hard disk using the aforementioned apparatus.

BACKGROUND

Both advances in technology and economies of scale have led to the downward trending price of a single unit of non-volatile storage memory. This decreasing price of non-volatile storage memory has led to non-volatile storage memory devices with voluminous amounts of storage capacity becoming affordable to even a non-corporate home user. This affordability has led to an increasing popularity of non-volatile storage memory devices with voluminous amounts of storage capacity.

Besides the increasing affordability of such non-volatile storage memory devices, one of the driving forces for the increasing popularity of non-volatile storage memory devices with voluminous amounts of storage capacity relates to the ease of creating and distributing digital content such as, for example, videos, photographs, presentations, and the like. In addition, an increasing number of people are converting their video/DVD collections into digital format for reasons such as, for example, ensuring longevity of their content, ensuring ease of accessibility to their video/DVD collection over a network, reclaiming storage space taken up by their video/DVD collection, and so forth. Such converted video/DVD collections typically also take up substantial amounts of storage capacity.

In view of the aforementioned, given the ease in creating and distributing digital content which typically takes up substantial amounts of storage capacity, it is evident that non-volatile storage memory devices with voluminous amounts of storage capacity are necessary to store the digital content mentioned in the preceding paragraph.

Unfortunately, voluminous amounts of digital content need to be managed in a proper manner in order to provide a favourable user experience. It would be undesirable if accessing the digital content was inconvenient for the user in relation to, for example, access time, locating of content, and so forth. Furthermore, storage of the content should also be robust to ensure longevity of the stored content. In this regard, it is evident that managing of digital content is essential when dealing with voluminous amounts of digital content.

In addition, it is also unfortunate that when a plurality of non-volatile storage memory devices with voluminous amounts of storage capacity are used, higher amounts of power are consumed as it is necessary for power to be drawn for each of the non-volatile memory devices. This is undesirable as content is typically drawn only from a single non-volatile memory device at any instance in time unless the plurality of non-volatile storage memory devices is set up in a RAID configuration.

The present invention aims to address the issues mentioned in the preceding paragraphs.

SUMMARY

In a first aspect, there is provided a first dock for a portable hard disk, where the first dock is connectable to a host device. The first dock includes at least one first connector for connection to another dock, the at least one first connector including both data and power connections; a processor coupled to the at least one first connector, the processor being for both controlling the first dock, and managing content of a portable hard disk docked to the first dock, where the managing of content includes synchronizing the content with the host device to shorten a time required to access content of the portable hard disk subsequent to docking to the first dock; at least one second connector coupled to the processor for enabling docking of a portable hard disk with the first dock, the at least one second connector including both data and power connections; and at least one third connector coupled to the processor for enabling connector of a second dock to the first dock, the at least one third connector including both data and power connections. It is advantageous that the host device is able to access content from portable hard disks that are docked with the first dock and the second dock.

Preferably, content from the portable hard disk connected to the first dock is accessed during the operational mode of the portable hard disk. Similarly, content from the portable hard disk connected to the first dock is not accessed when the portable hard disk is in a stand-by mode. Power consumed by the first dock may be lower during the stand-by mode. Preferably, the content relates to folders with movie files.

It is preferable that the synchronization of the content relates to data which enables the content to be indexed and searchable using a content management application running on the host device. The indexing may be carried out using parameters obtained from metadata from the content such as, for example, title, genre, thespian identity, director identity, producer identity, type of awards garnered, year of completion and so forth.

The managing of content may further include de-fragmenting the content on the portable hard disk subsequent to docking to the first dock to ensure that the content on the portable hard disk remains both accessible and undamaged.

It is preferable that the processor is able to send at least one signal to the host device to enable the host device to identify the first dock, where the host device is unable to access content through the first dock if the first dock is not identifiable. Preferably, the processor is configured to send the at least one signal to the host device only if contents of a portable hard disk docked to the first dock include a digital rights management (DRM) component. The processor may encrypt the content of the portable hard disk such that content of the portable hard disk is accessible only when the portable hard disk is connected to the first dock.

Both the at least one first connector and the at least one second connector may employ a connection such as, for example, USB, IEEE1394, SATA, Ethernet, any proprietary format and so forth.

The second dock may be mounted onto the first dock with a securing mechanism with interlocking parts on both the first dock and the second dock, with the securing mechanism being for ensuring both secure mounting of the second dock onto the first dock and an effective connection of the second dock to the first dock with the at least one third connector. The securing mechanism may be a robust hook-up mechanism. The first dock may be identical to the second dock.

It is preferable that the at least one first connector is able to connect to a third dock, the third dock being connected to a fourth dock in a second vertical column, the first dock connected to the second dock being a first vertical column, with the host device being able to access content from portable hard disks connected to the third dock and the fourth dock.

In a second aspect, there is provided a method for accessing content on a host device from a plurality of portable hard disk drives. The method includes connecting a first dock to the host device using a host connector of the host device; connecting a first portable hard disk to the first dock using at least one second connector of the first dock; mounting a second dock onto the first dock using a securing mechanism with interlocking parts on the first dock and the second dock respectively; connecting a second portable hard disk to the second dock using at least one sixth connector of the second dock; determining a mode of each of the first portable hard disk and the second portable hard disk, the mode being either operational or stand-by; setting the mode of each of the first portable hard disk and the second portable hard disk; and managing content of each portable hard disk by synchronizing the content of each portable hard disk with the host device to shorten a time required to access content.

It is preferable that content from each portable hard disk connected to each dock is accessed during the operational mode of each portable hard disk. Similarly, content from each portable hard disk connected to each dock is not accessed during the stand-by mode of each portable hard disk. Power consumed by each dock is lower during the stand-by mode than during the operational mode of each portable hard disk. The content may relate to folders with movie files.

The synchronization of the content preferably enables the content to be indexed and searchable using a content management application running on the host device. The indexing may be carried out using parameters obtained from metadata from the content such as, for example, title, genre, thespian identity, director identity, producer identity, type of awards garnered, year of completion and the like.

The managing of content may further include de-fragmenting the content on each portable hard disk subsequent to docking to each dock to ensure that the content on the portable hard disk remains both accessible and undamaged.

The method may also further include sending at least one signal from each dock to the host device to enable the host device to identify each dock, where the host device is unable to access content through each dock if each dock is not identifiable. Furthermore, the content of the portable hard disk may be encrypted such that content of the portable hard disk is accessible only when the portable hard disk is connected to either the first or second dock.

Preferably, the processor is configured to send the at least one signal to the host device only if contents of a portable hard disk docked to the first dock include a digital rights management (DRM) component.

Both the at least one first connector and the at least one second connector may employ a connection such as, for example, USB, IEEE1394, SATA, Ethernet, any proprietary format and so forth.

It is preferable that the securing mechanism may be for ensuring both secure mounting of the second dock onto the first dock and an effective connection of the second dock to the first dock with an at least one third connector. The securing mechanism may be a robust hook-up mechanism. The first dock may be identical to the second dock.

The method may also further include connecting a third dock to the first dock, wherein the third dock is connected to a fourth dock in a second vertical column, the first dock connected to the second dock being a first vertical column, with the host device being able to access content from portable hard disks connected to the third dock and the fourth dock.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
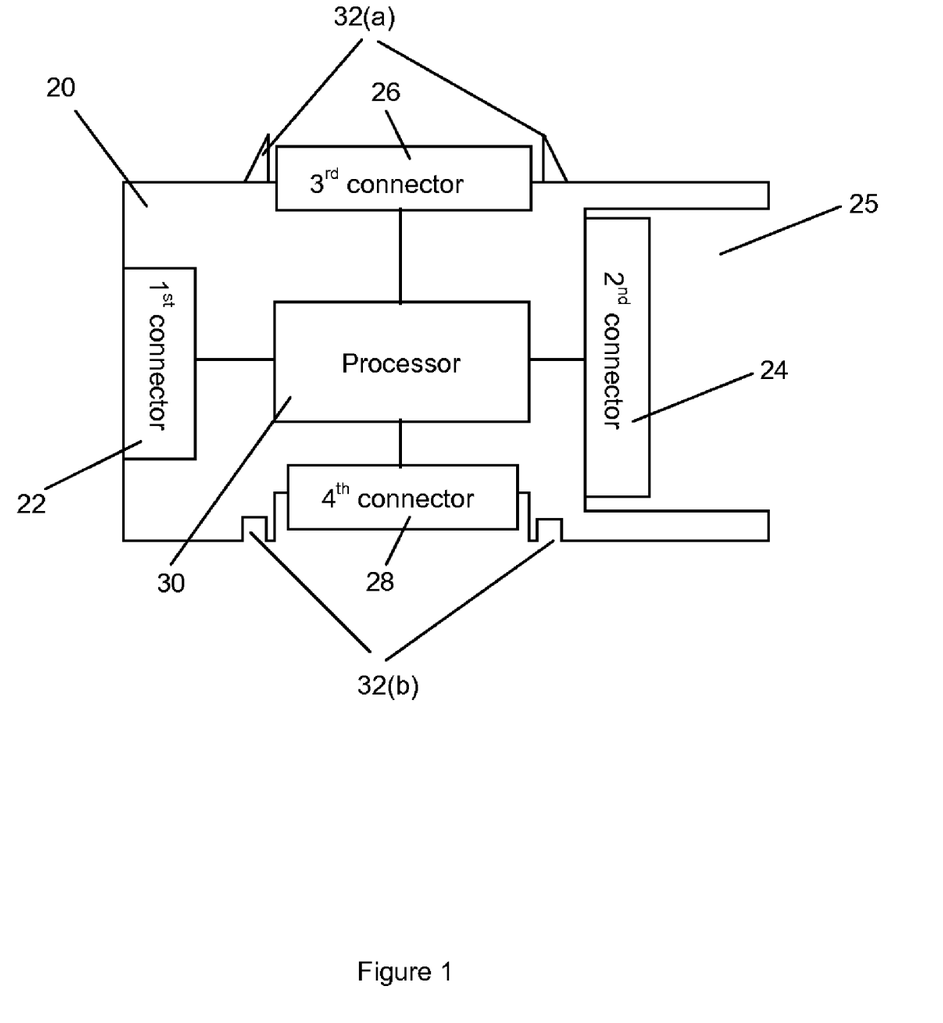
FIG. 1 shows a block diagram of a dock of the present invention.
Figure 2:
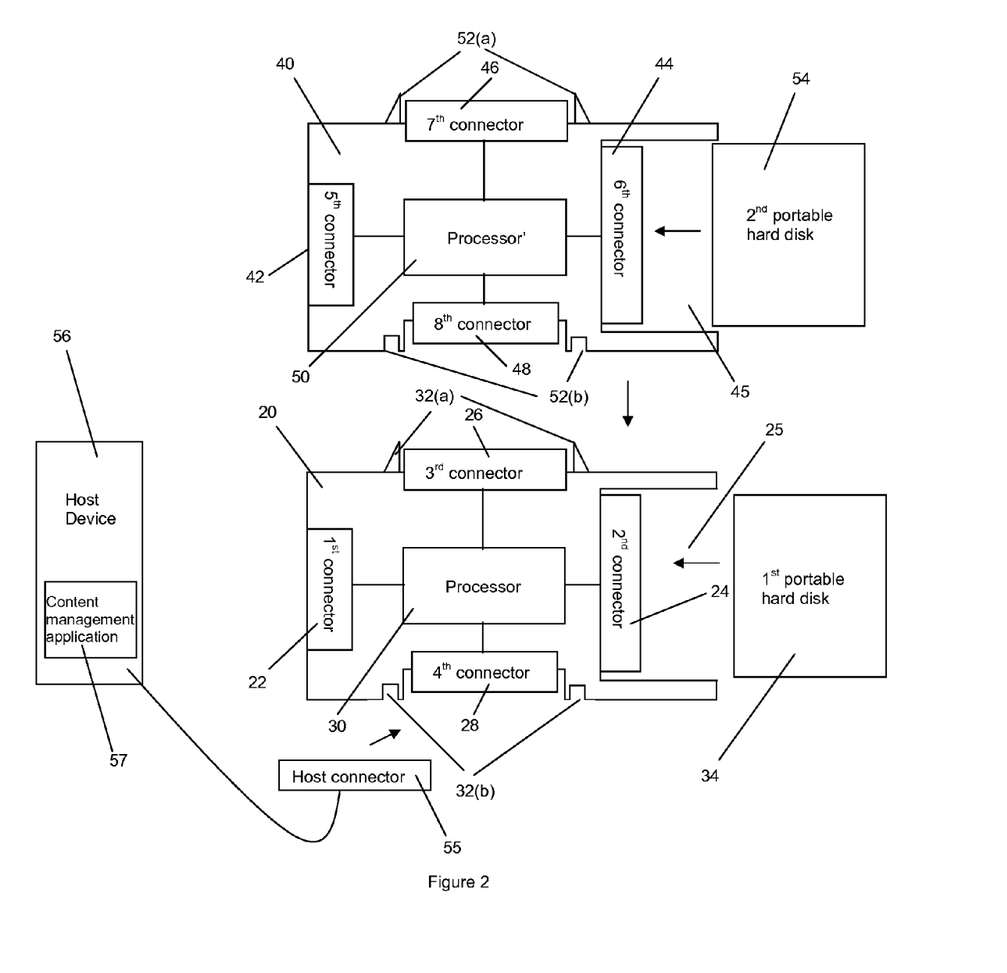
FIG. 2 shows a block diagram of the dock of the present invention during a first instance of the dock during use.
Figure 3:
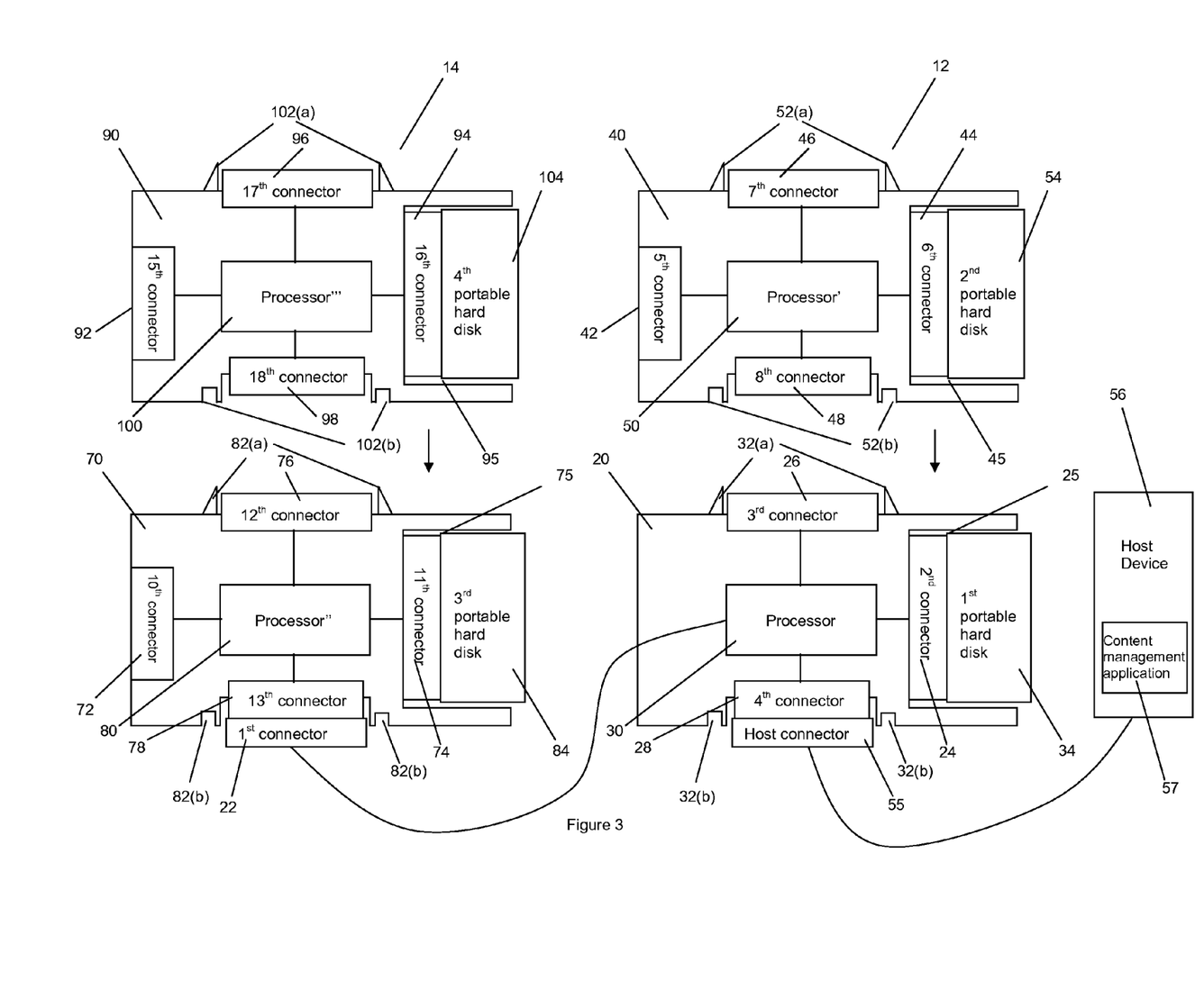
FIG. 3 shows a block diagram of the dock of the present invention during a second instance of the dock during use.

Reference is made to FIGS. 1, 2 and 3 when describing a first aspect of the present invention. It should be appreciated that FIG. 1 provides an overview of an apparatus, and FIGS. 2 and 3 show applications of the apparatus during a first instance and a second instance respectively, and that details of the apparatus and application of the apparatus may differ in ways which would not substantially deviate from the present invention.

Referring to FIG. 1, there is provided a first dock 20 for a portable hard disk. The first dock 20 may be connectable to a host device. The host device may be, for example, a personal computer, a notebook computer, a network storage device, and so forth. The host device may be used for control of the first dock 20.

The first dock 20 includes at least one first connector 22, the at least one first connector 22 being for connection to another dock, with the at least one first connector 22 including both data and power connections. The at least one first connector 22 may be in a form which is retractable/extendible. The data connection of the at least one first connector 22 may be for transmission of data between the docks, where the first dock 20 is a conduit for the transmission of data from the connected docks (each dock being connected to a portable hard disk) to the host device. In addition, the power connection may be for transmission of power from the host device to each dock, and consequently, each portable hard disk connected to each dock. The at least one first connector 22 may enable a connection such as, for example, USB, IEEE1394, SATA, Ethernet, any proprietary format, and so forth.

The first dock 20 may include a processor 30 coupled to the at least one first connector 22, the processor 30 being for both controlling each portable hard disk connected to the first dock 20 to be in either an operational mode or a stand-by mode, and managing content of each portable hard disk docked to the first dock 20. The processor 30 may be able to send at least one signal to the host device to enable the host device to identify the first dock 20, where the host device is unable to access content through the first dock if the first dock 20 is not identifiable. The processor 30 may be configured to send the at least one signal to the host device only if contents of each portable hard disk docked to the first dock 20 include a digital rights management (DRM) component. The processor 30 of the first dock 20 may encrypt the content of each portable hard disk docked to the first dock 20 such that the content of each portable hard disk may only be accessible when each portable hard disk is connected to the first dock 20.

During the operational mode of each portable hard disk, content from each portable hard disk connected to the first dock 20 is accessed by the host device. Power consumed by the first dock 20 is lower during the stand-by mode of each portable hard disk than during the operational mode of each portable hard disk. This is because during the stand-by mode of each portable hard disk, the functionality of the first dock 20 is minimized as content from the portable hard disk connected to the first dock 20 is not accessed by the host device. It should be appreciated that having the stand-by mode for each portable hard disk aids in minimizing consumption of power by the first dock 20.

The managing of content of each portable hard disk docked to the first dock 20 includes synchronizing the content of each portable hard disk with the host device subsequent to docking of each portable hard disk to the first dock 20. Synchronizing the content of each portable hard disk with the host device may shorten a time required to access content from each portable hard disk. The managing of content may further include de-fragmenting the content on each portable hard disk subsequent to docking to the first dock 20. The de-fragmenting of each portable hard disk may ensure that the content on each portable hard disk remains both accessible and undamaged. The content may relate to folders with movie files. The portions of the content being cached may relate to data which is initially read when accessing the folders. In addition, the synchronization of the content may also enable the content to be indexed and searchable using a content management application running on the host device. The indexing of the content may be carried out using parameters obtained from metadata from the content such as, for example, title, genre, thespian identity, director identity, producer identity, type of awards garnered, year of completion and so forth. The content management application may include a graphical user interface which enables both ease of access to the indexed content and search-ability of the content.

The first dock 20 may include at least one second connector 24 coupled to the processor 30 for enabling docking of a portable hard disk with the first dock 20. It should be noted that during instances when there is more than one second connector 24, each second connector 24 may be connected to a portable hard disk. Each portable hard disk connected to each second connector 24 may either be stacked on another connected portable hard disk or placed adjacent to another connected portable hard disk. The at least one second connector 24 may be located within a first receptor 25 for the placement of the portable hard disk. The at least one second connector 24 may include both data and power connections. The data connection of the at least one second connector 24 may be for transmission of data from the portable hard disk to the host device, where the first dock 20 is a conduit for the transmission of data from each portable hard disk to the host device. In addition, the power connection may be for transmission of power from the host device to the first dock 20, and consequently, each portable hard disk. The at least one second connector 24 may enable a connection such as, for example, USB, IEEE1394, SATA, Ethernet, any proprietary format, and so forth. When the processor 30 detects that content is not drawn from each portable hard disk docked to the first dock 20, each portable hard disk connected to the first dock 20 is powered down to a stand-by mode.

The first dock 20 may also include at least one third connector 26 coupled to the processor 30 for enabling connector of a second dock 40 (in FIG. 2) to the first dock 20, the at least one third connector 26 including both data and power connections. The first dock 20 may be identical to the second dock 40. The at least one third connector 26 may be a proprietary connector. The proprietary connector of the at least one third connector 26 may be mate-able with an at least one fourth connector 28 which is also included in the first dock 20. A connection to the host device may be made using the at least one fourth connector 28. The at least one third connector 26 and the at least one fourth connector 28 may each enable a connection such as, for example, USB, IEEE1394, SATA, Ethernet, any proprietary format, and so forth.

The second dock 40 may be mounted onto the first dock 20 with a securing mechanism with interlocking parts 32(*a*), 52(*b*) on the first dock 20 and the second dock 40 respectively, the securing mechanism being for ensuring both secure mounting of the second dock 40 onto the first dock 20 and an effective connection of the second dock 40 to the first dock 20 with the at least one third connector 26. The securing mechanism may be a hook-up mechanism which is robust in design. The securing mechanism may also be for ensuring stability of a plurality of docks which are stacked on top of each other in a form of a vertical column such that the vertical column of docks is stable and does not topple.

When the first dock 20 is connected with the host device via the fourth connector 28, the host device is able to access content from each portable hard disk that is docked with the first dock 20. When the second dock 40 is mounted onto the first dock 20, the host device is advantageously also able to access content from each portable hard disk that is docked with the second dock 40. However, when data is accessed from each portable hard disk mounted on the second dock 40, each portable hard disk that is docked with the first dock 20 is powered down to a stand-by mode. A more detailed description of the second dock 40 being mounted onto the first dock 20 will be provided in subsequent paragraphs of the description.

Referring to FIG. 2, there is shown a block diagram of the second dock 40 being mounted onto the first dock 20. FIG. 2 shows the host device 56, where the host device 56 may be, for example, a personal computer, a notebook computer, a network storage device, and so forth. The host connector 55 of the host device is shown as being connected to the fourth connector 28 of the first dock 20. It should be appreciated that the host device 56 includes a host connector 55, with the host connector 55 being able to couple with the at least one fourth connector 28 of the first dock 20 to ensure a functional connection (including both data and power connections) between the host device 56 and the first dock 20.

A first portable hard disk 34 which is connectable to the at least one second connector 24 of the first dock 20 is placed within the first receptor 25 of the first dock 20. It should be appreciated that even though only one portable hard disk 34 is shown, more than one portable hard disk may be connected to the first dock 20 using the at least one second connector 24 as described in preceding paragraphs. The at least one second connector 24 may include both data and power connections. The data connection of the at least one second connector 24 may be for transmission of data from the first portable hard disk 34 to the host device 56, where the first dock 20 is a conduit for the transmission of data from the first portable hard disk 34 to the host device 56. In addition, the power connection may be for transmission of power from the host device 56 to the first dock 20, and consequently, the first portable hard disk 34. The at least one second connector 24 may enable a connection such as, for example, USB, IEEE1394, SATA, Ethernet, any proprietary format, and so forth.

The second dock 40 may include an at least one fifth connector 42, which may be identical to the at least one first connector 22 of the first dock 20. Similarly, an at least one sixth connector 44 may be identical to the at least one second connector 24 of the first dock 20, an at least one seventh connector 46 may be identical to the at least one third connector 26 of the first dock 20, and an at least one eighth connector 48 may be identical to the at least one fourth connector 28 of the first dock 20. In addition, a processor' 50 may be identical to the processor 30 of the first dock 20. In this regard, it should be appreciated that the second dock 40 may be identical to the first dock 20.

A second portable hard disk 54 which is connectable to the at least one sixth connector 44 of the second dock 40 is placed within a second receptor 45 of the second dock 40. The at least one sixth connector 44 may include both data and power connections. The data connection of the at least one sixth connector 44 may be for transmission of data from the second portable hard disk 54 to the host device 56, where both the second dock 40 and first dock 20 acts as a conduit for the transmission of data from the second portable hard disk 54 to the host device 56 when the second dock 40 is mounted onto the first dock 20. In addition, the power connection may be for transmission of power from the host device 56 to both the first dock 20 and the second dock 40, and consequently, the second portable hard disk 54. When data is accessed from the second portable hard disk 54 mounted on the second dock 40, the first portable hard disk 34 is powered down to a stand-by mode. The at least one sixth connector 24 may enable a connection such as, for example, USB, IEEE1394, SATA, Ethernet, any proprietary format, and so forth. While only two portable hard disk drives 34, 54 are depicted in FIG. 2, it should be appreciated that more than two portable hard disk drives may be contemplated for the present invention. This will be further described in a subsequent portion of the description with reference to FIG. 3.

As mentioned earlier, the second dock 40 may be mounted onto the first dock 20 with a securing mechanism with interlocking parts 32(a), 52(b) on the first dock 20 and the second dock 40 respectively, the securing mechanism being for ensuring both secure mounting of the second dock 40 onto the first dock 20 and an effective connection of the second dock 40 to the first dock 20 with the at least one third connector 26. The securing mechanism may be a hook-up mechanism which is robust in design. It should be noted that the at least one third connector 26 of the first dock 20 may be coupled with the at least one eighth connector 48 of the second dock 40. The securing mechanism may also be for ensuring stability of a plurality of docks which are stacked on top of each other in a form of a vertical column such that the vertical column of docks is stable and does not topple.

As mentioned earlier, when the second dock 40 connected with the second portable hard disk 54 is mounted onto the first dock 20 connected with the first portable hard disk 34, the host device 56 is able to access content from both the first portable hard disk 34 and the second portable hard disk 54. Content on both the first portable hard disk 34 and the second portable hard disk 54 may be synchronized with the host device 56. Synchronizing the content of the first portable hard disk 34 and the second portable hard disk 54 with the host device may shorten a time required to access content from the portable hard disks 34, 54. Synchronizing the content of the portable hard disks 34, 54 also enables the content to be indexed and searchable, and power is managed on both the first dock 20 and the second dock 40 to minimize power wastage.

Referring to FIG. 3, there is shown a block diagram of two vertical columns of docks being connected to the host device 56. It should be noted that a first vertical column 12 is formed with the first dock 20 and the second dock 40, while a second vertical column 14 is formed with a third dock 70 and a fourth dock 90. As mentioned earlier, the host device 56 may be, for example, a personal computer, a notebook computer, a network storage device, and so forth. The host connector 55 of the host device is shown as being connected to the fourth connector 28 of the first dock 20. It should be appreciated that the host device 56 includes a host connector 55, with the host connector 55 being able to couple with the at least one fourth connector 28 of the first dock 20 to ensure a functional connection (including both data and power connections) between the host device 56 and the first dock 20.

A first portable hard disk 34 which is connectable to the at least one second connector 24 of the first dock 20 is placed within the first receptor 25 of the first dock 20. The at least one second connector 24 may include both data and power connections. The data connection of the at least one second connector 24 may be for transmission of data from the first portable hard disk 34 to the host device 56, where the first dock 20 is a conduit for the transmission of data from the first portable hard disk 34 to the host device 56. In addition, the power connection may be for transmission of power from the host device 56 to the first dock 20, and consequently, the first portable hard disk 34. The at least one second connector 24 may enable a connection such as, for example, USB, IEEE1394, SATA, Ethernet, any proprietary format, and so forth.

The second dock 40 may include an at least one fifth connector 42, which may be identical to the at least one first connector 22 of the first dock 20. Similarly, an at least one sixth connector 44 may be identical to the at least one second connector 24 of the first dock 20, an at least one seventh connector 46 may be identical to the at least one third connector 26 of the first dock 20, and an at least one eighth connector 48 may be identical to the at least one fourth connector 28 of the first dock 20. In addition, a processor' 50 may be identical to the processor 30 of the first dock 20. In this regard, it should be appreciated that the second dock 40 may be identical to the first dock 20.

A second portable hard disk 54 which is connectable to the at least one sixth connector 44 of the second dock 40 is placed within a second receptor 45 of the second dock 40. The at least one sixth connector 44 may include both data and power connections. The data connection of the at least one sixth connector 44 may be for transmission of data from the second portable hard disk 54 to the host device 56, where both the second dock 40 and first dock 20 acts as a conduit for the transmission of data from the second portable hard disk 54 to the host device 56 when the second dock 40 is mounted onto the first dock 20. In addition, the power connection may be for transmission of power from the host device 56 to both the first dock 20 and the second dock 40, and consequently, the second portable hard disk 54. The at least one sixth connector 24 may enable a connection such as, for example, USB, IEEE1394, SATA, Ethernet, any proprietary format, and so forth.

As mentioned earlier, the second dock 40 may be mounted onto the first dock 20 with a securing mechanism with interlocking parts 32(a), 52(b) on the first dock 20 and the second dock 40 respectively, the securing mechanism being for ensuring both secure mounting of the second dock 40 onto the first dock 20 and an effective connection of the second dock 40 to the first dock 20 between the at least one third connector 26 and the at least one eighth connector 48. The securing mechanism may be a hook-up mechanism which is robust in design. It should be noted that the at least one third connector 26 of the first dock 20 may be coupled with the at least one eighth connector 48 of the second dock 40. The securing mechanism may also be for ensuring stability of the first vertical column 12 such that the first vertical column 12 of docks is stable and does not topple.

A third portable hard disk 84 which is connectable to the at least one eleventh connector 74 of the third dock 70 is placed within a third receptor 75 of the third dock 70. The at least one eleventh connector 74 may include both data and power connections. The at least one eleventh connector 74 may enable a connection such as, for example, USB, IEEE1394, SATA, Ethernet, any proprietary format, and so forth. The data connection of the at least one eleventh connector 74 may be for transmission of data from the third portable hard disk 84 to the host device 56, where the third dock 70 is a conduit for the transmission of data from the third portable hard disk 84 to the host device 56 via the first dock 20. In addition, the power connection may be for transmission of power from the host device 56 to the third dock 70, and consequently, the third portable hard disk 84. The at least one first connector 22 of the first dock 20 may be connected to an at least one thirteenth connector 78 of the third dock 70 to enable a connection from the third dock 70 (and the second vertical column 14) to the host device 56.

An at least one tenth connector 72 and an at least one fifteenth connector 92 of the third 70 and fourth 90 docks respectively, may be identical to the at least one first connector 22 of the first dock 20. Similarly, an at least one eleventh connector 74 and an at least one sixteenth connector 94 of the third 70 and fourth 90 docks respectively, may be identical to the at least one second connector 24 of the first dock 20. In a similar manner, an at least one twelfth connector 76 and an at least one seventeenth connector 96 of the third 70 and fourth 90 docks respectively may be identical to the at least one third connector 26 of the first dock 20. Finally, an at least one thirteenth connector 78 and an at least one eighteenth connector 98 of the third 70 and fourth 90 docks respectively may be identical to the at least one fourth connector 28 of the first dock 20. Processor'' 80 and processor''' 100 of the third 70 and fourth 90 docks respectively may be identical to the processor 30 of the first dock 20. In this regard, it should be appreciated that both the third dock 70 and the fourth dock 90 may be identical to the first dock 20.

A fourth portable hard disk 104 which is connectable to the at least one sixteenth connector 94 of the fourth dock 90 is placed within a fourth receptor 95 of the fourth dock 90. The at least one sixteenth connector 94 may include both data and power connections. The data connection of the at least one sixteenth connector 94 may be for transmission of data from the fourth portable hard disk 104 to the host device 56, where the fourth dock 90, third dock 70 and the first dock 20 acts as a conduit for the transmission of data from the fourth portable hard disk 104 to the host device 56 when the fourth dock 90 is mounted onto the third dock 70. In addition, the power connection may be for transmission of power from the host device 56 to the first dock 20, the third dock 70, the fourth dock 90 and consequently, the fourth portable hard disk 104. However, only the portable hard disk which is being accessed by the host device 56 is fully powered. The other portable hard disks may correspondingly be in a stand-by mode.

The fourth dock 90 may be mounted onto the third dock 70 with a securing mechanism with interlocking parts 82(*a*), 102(*b*) on the third dock 70 and the fourth dock 90 respectively, the securing mechanism being for ensuring both secure mounting of the fourth dock 90 onto the third dock 70 and an effective connection of the fourth dock 90 to the third dock 70 between the at least one twelfth connector 76 and the at least one eighteenth connector 98. The securing mechanism may be a hook-up mechanism which is robust in design. It should be noted that the at least one twelfth connector 76 of the third dock 70 may be coupled with the at least one eighteenth connector 98 of the fourth dock 90. The securing mechanism may also be for ensuring stability of the second vertical column 14 such that the second vertical column 14 of docks is stable and does not topple.

It should be noted that each of the vertical columns 12, 14 may include more than two docks stacked in a vertical manner. This aspect advantageously ensures that a number of docks connected to the host device 56 is scalable and may be physically scaled in either a vertical or horizontal manner.

Figure 4:
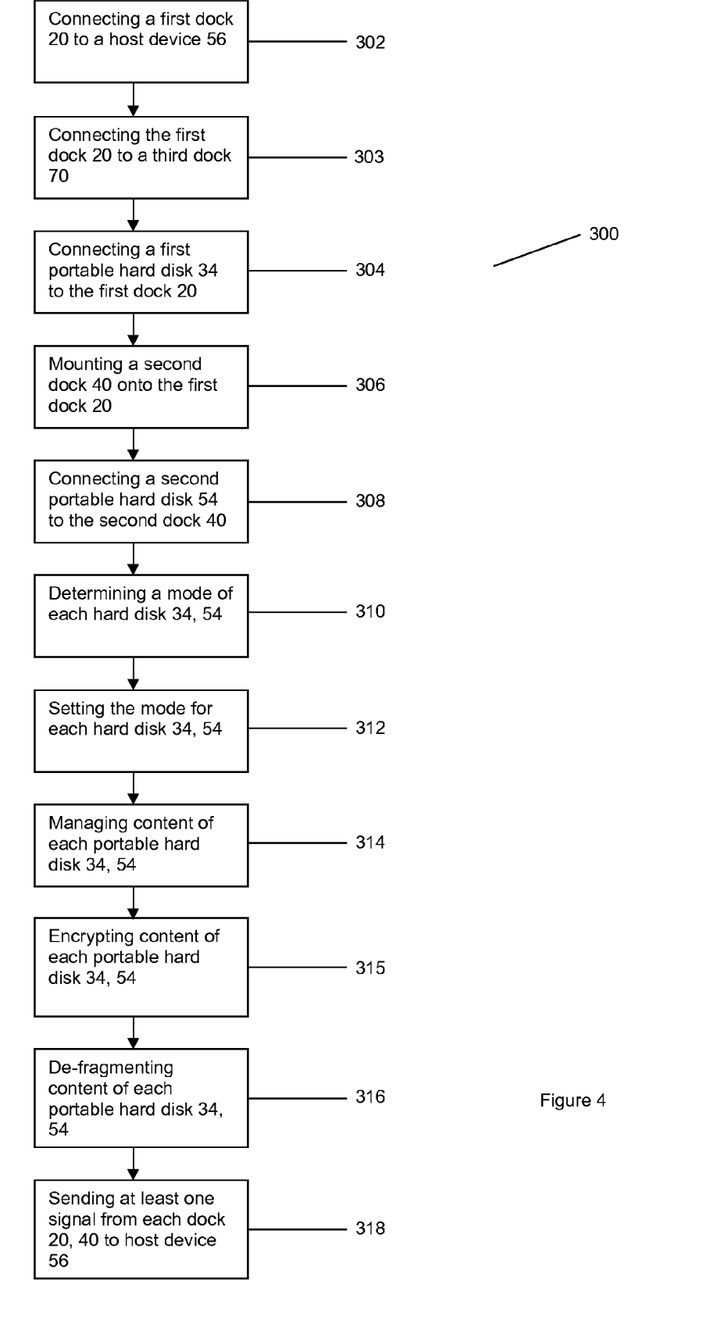
FIG. 4 shows a process flow of a method of the present invention.

Reference is made to FIGS. 2 and 4 when describing a second aspect of the present invention. It should be appreciated that FIGS. 2 and 4 provide an overview of an application of a method and an overview of the method respectively. It should be appreciated that a sequence of steps in the method may differ in ways which would not substantially deviate from the present invention.

Referring to FIGS. 2 and 4, there is provided a method 300 for accessing content on a host device 56 from a plurality of portable hard disk drives 34, 54. While only two portable hard disk drives 34, 54 are depicted in FIG. 2, it should be appreciated that more than two portable hard disk drives may be contemplated for the present invention. In addition, the more than two portable hard disk drives may be arranged in vertical stacked columns in a manner as described earlier with reference to FIG. 3. The host device may be, for example, a personal computer, a notebook computer, a network storage device, and so forth.

The method 300 includes connecting a first dock 20 to the host device 56 (302) by coupling the host connector 55 to the at least one fourth connector 28 of the first dock 20. The at least one fourth connector 28 may include both data and power connections. The data connection of the at least one fourth connector 28 may be for transmission of data from a first portable hard disk 34 to the host device 56, where the first dock 20 is a conduit for the transmission of data from the first portable hard disk 34 to the host device 56. In addition, the power connection may be for transmission of power from the host device 56 to the first dock 20, and consequently, the first portable hard disk 34. The at least one fourth connector 28 may enable a connection such as, for example, USB, IEEE1394, SATA, Ethernet, any proprietary format, and so forth.

The method 300 may also include connecting a third dock 70 to the first dock 20 (303), where the third dock 70 may be connected to a fourth dock 90 in a second vertical column, the first dock 20 connected to the second dock 40 being a first vertical column. It should be noted that each of the vertical columns may include more than two docks stacked in a vertical manner. This aspect advantageously ensures that a number of docks connected to the host device 56 is scalable and may be physically scaled in either a vertical or horizontal manner.

Subsequently, the method 300 may include connecting the first portable hard disk 34 to the first dock 20 (304) using at least one second connector 24 of the first dock 20. It should be appreciated that even though only the first portable hard disk 34 is shown, more than one portable hard disk may be connected to the first dock 20. The at least one second connector 24 may be located within a first receptor 25 for the placement of the first portable hard disk 34. The at least one second connector 24 may include both data and power connections. The data connection of the at least one second connector 24 may be for transmission of data from the first portable hard disk 34 to the host device 56, where the first dock 20 is a conduit for the transmission of data from the first portable hard disk 34 to the host device 56. In addition, the power connection may be for transmission of power from the host device 56 to the first dock 20, and consequently, the first portable hard disk 34. The at least one second connector 24 may enable a connection such as, for example, USB, IEEE1394, SATA, Ethernet, any proprietary format, and so forth.

The method 300 may also include mounting a second dock 40 onto the first dock 20 using a securing mechanism with interlocking parts 32(a), 52(b) on the first dock 20 and the second dock 40 respectively. The securing mechanism being for ensuring both secure mounting of the second dock 40 onto the first dock 20 and an effective connection of the second dock 40 to the first dock 20 with the at least one third connector 26. The securing mechanism may be a hook-up mechanism which is robust in design. The securing mechanism may also be for ensuring stability of a vertical column comprising the first dock 20 and the second dock 40 such that the vertical column of docks 20, 40 is stable and does not topple. Multiple vertical columns of docks may be connected to the host device 56 as per the manner described earlier in FIG. 3.

Furthermore, the method 300 also includes connecting a second portable hard disk 54 to the second dock 40 (308) using at least one sixth connection 44 of the second dock 40. When the second dock 40 connected with the second portable hard disk 54 is mounted onto the first dock 20 connected with the first portable hard disk 34, the host device 56 is able to access content from both the first portable hard disk 34 and the second portable hard disk 54.

The method 300 also includes determining a mode of each of the first portable hard disk 34 and the second portable hard disk 54 (310), the mode being either operational or stand-by. If content on the first portable hard disk 34 connected to the first dock 20 is accessed, the first portable hard disk 34 is consequently in an operational mode while the second portable hard disk 54 is in a stand-by mode. If content on the second portable hard disk 54 connected to the second dock 40 is accessed, the second portable hard disk 54 is consequently in an operational mode while the first portable hard disk 34 is in a stand-by mode. Subsequently, the mode for each of the first portable hard disk 34 and the second portable hard disk 54 is set (312). During the operational mode of each portable hard disk 34, 54 content from each portable hard disk 34, 54 is accessible by the host device 56. Power consumed by each portable hard disk 34, 54 is lower during the stand-by mode than during the operational mode. It should be appreciated that having the stand-by mode aids in minimizing consumption of power.

The method 300 further includes managing content of each portable hard disk 34, 54 (314) by synchronizing the content of each portable hard disk 34, 54 with the host device 56 to shorten a time required by the host device 56 to access content on each portable hard disk 34, 54. The managing of content may further include de-fragmenting the content on each portable hard disk 34, 54 (316). The de-fragmenting of content of each portable hard disk 34, 54 may ensure that the content on each portable hard disk 34, 54 remain both accessible and undamaged. The content may relate to folders with movie files. The portions of the content being cached may relate to data which is initially read when accessing the folders. In addition, the synchronization of the content may also enable the content to be indexed and searchable using a content management application 57 running on the host device 56. The indexing of the content may be carried out using parameters obtained from metadata from the content such as, for example, title, genre, thespian identity, director identity, producer identity, type of awards garnered, year of completion and so forth. The content management application 57 may include a graphical user interface which enables both ease of access to the indexed content and search-ability of the content.

Finally, the method 300 may include sending at least one signal from each dock 20, 40 to the host device 56 (318) to enable the host device 56 to identify each dock 20, 40, where the host device 56 is unable to access content through each dock 20, 40 if each dock is not identifiable. Each dock 20, 40 may be configured to send the at least one signal to the host device 56 only if contents of respective portable hard disks 34, 54 docked to the first dock 20 and the second dock 40 include a digital rights management (DRM) component. The processor 30 of the first dock 20 may encrypt the content of the portable hard disks 34, 54 docked to the docks 20, 40 (315).

The method 300 enables the host device 56 to be able to access content from both the first portable hard disk 34 and the second portable hard disk 54 when the second dock 40 connected with the second portable hard disk 54 is mounted onto the first dock 20 connected with the first portable hard disk 34. Advantageously, the content is indexed and searchable, and power is managed on both the first dock 20 and the second dock 40 to minimize power wastage.

Whilst there has been described in the foregoing description preferred embodiments of the present invention, it will be understood by those skilled in the technology concerned that many variations or modifications in details of design or construction may be made without departing from the present invention.

The invention claimed is:

1. A first dock for a portable hard disk, the first dock being connectable to a host device, the first dock including:
   at least one first connector for connection to another dock, the at least one first connector including both data and power connections;
   a processor coupled to the at least one first connector, the processor being for both controlling the first dock, and managing content of a portable hard disk docked to the first dock, where the managing of content includes synchronizing the content with the host device to shorten a time required to access content of the portable hard disk subsequent to docking to the first dock;
   at least one second connector coupled to the processor for enabling docking of a portable hard disk with the first dock, the at least one second connector including both data and power connections; and
   at least one third connector coupled to the processor for enabling connector of a second dock to the first dock, the at least one third connector including both data and power connections,
   wherein the host device is able to access content from portable hard disks that are docked with the first dock and the second dock.

2. The first dock as claimed in claim 1, wherein content from the portable hard disk connected to the first dock is accessed during the operational mode of the portable hard disk.

3. The first dock as claimed in claim 1, wherein content from the portable hard disk connected to the first dock is not accessed when the portable hard disk is in a stand-by mode.

4. The first dock as claimed in claim 3, wherein power consumed by the first dock is lower during the stand-by mode.

5. The first dock as claimed in claim 1, wherein the content relates to folders with movie files.

6. The first dock as claimed in claim 1, wherein the synchronization of the content relate to data which enables the content to be indexed and searchable using a content management application running on the host device.

7. The first dock as claimed in claim 6, wherein the indexing is carried out using parameters obtained from metadata from the content selected from a group comprising: title, genre, thespian identity, director identity, producer identity, type of awards garnered, and year of completion.

8. The first dock as claimed in claim 1, wherein the managing of content further includes de-fragmenting the content on the portable hard disk subsequent to docking to the first dock to ensure that the content on the portable hard disk remains both accessible and undamaged.

9. The first dock as claimed in claim 1, wherein the processor is able to send at least one signal to the host device to enable the host device to identify the first dock, where the host device is unable to access content through the first dock if the first dock is not identifiable.

10. The first dock as claimed in claim 9, wherein the processor is configured to send the at least one signal to the host device only if contents of a portable hard disk docked to the first dock include a digital rights management (DRM) component.

11. The first dock as claimed in claim 10, wherein the processor encrypts the content of the portable hard disk such that content of the portable hard disk is accessible only when the portable hard disk is connected to the first dock.

12. The first dock as claimed in claim 1, wherein both the at least one first connector and the at least one second connector employs a connection selected from a group comprising: USB, IEEE1394, SATA, Ethernet, and any proprietary format.

13. The first dock as claimed in claim 1, wherein the second dock is mounted onto the first dock with a securing mechanism with interlocking parts on both the first dock and the second dock, the securing mechanism being for ensuring both secure mounting of the second dock onto the first dock and an effective connection of the second dock to the first dock with the at least one third connector.

14. The first dock as claimed in claim 13, wherein the securing mechanism being a robust hook-up mechanism.

15. The first dock as claimed in claim 1, wherein the first dock is identical to the second dock.

16. The first dock as claimed in claim 1, wherein the at least one first connector is able to connect to a third dock, the third dock being connected to a fourth dock in a second vertical column, the first dock connected to the second dock being a first vertical column, with the host device being able to access content from portable hard disks connected to the third dock and the fourth dock.

17. A method for accessing content on a host device from a plurality of portable hard disk drives, the method including:
connecting a first dock to the host device using a host connector of the host device;
connecting a first portable hard disk to the first dock using at least one second connector of the first dock;
mounting a second dock onto the first dock using a securing mechanism with interlocking parts on the first dock and the second dock respectively;
connecting a second portable hard disk to the second dock using at least one sixth connector of the second dock;
determining a mode of each of the first portable hard disk and the second portable hard disk, the mode being either operational or stand-by;
setting the mode of each of the first portable hard disk and the second portable hard disk; and
managing content of each portable hard disk by synchronizing the content of each portable hard disk with the host device to shorten a time required to access content.

18. The method as claimed in claim 17, wherein content from each portable hard disk connected to each dock is accessed during the operational mode of each portable hard disk.

19. The method as claimed in claim 17, wherein content from a portable hard disk connected to each dock is not accessed during the stand-by mode of each portable hard disk.

20. The method as claimed in claim 17, wherein power consumed by each dock is lower during the stand-by mode than during the operational mode.

21. The method as claimed in claim 17, wherein the content relates to folders with movie files.

22. The method as claimed in claim 21, wherein the synchronization of the content enables the content to be indexed and searchable using a content management application running on the host device.

23. The method as claimed in claim 22, wherein the indexing is carried out using parameters obtained from metadata from the content selected from a group comprising: title, genre, thespian identity, director identity, producer identity, type of awards garnered, and year of completion.

24. The method as claimed in claim 17, wherein the managing of content further includes de-fragmenting the content on each portable hard disk subsequent to docking to each dock to ensure that the content on the portable hard disk remains both accessible and undamaged.

25. The method as claimed in claim 17, further including sending at least one signal from each dock to the host device to enable the host device to identify each dock, where the host device is unable to access content through each dock if each dock is not identifiable.

26. The method as claimed in claim 17, further including encrypting the content of the portable hard disk such that content of the portable hard disk is accessible only when the portable hard disk is connected to either the first or second dock.

27. The method as claimed in claim 26, wherein the processor is configured to send the at least one signal to the host device only if contents of a portable hard disk docked to the first dock include a digital rights management (DRM) component.

28. The method as claimed in claim 17, wherein both the at least one first connector and the at least one second connector employs a connection selected from a group comprising: USB, IEEE1394, SATA, Ethernet, and any proprietary format.

29. The method as claimed in claim 17, wherein the securing mechanism is for ensuring both secure mounting of the second dock onto the first dock and an effective connection of the second dock to the first dock with an at least one third connector.

30. The method as claimed in claim 17, wherein the securing mechanism being a robust hook-up mechanism.

31. The method as claimed in claim 17, wherein the first dock is identical to the second dock.

32. The method as claimed in claim 17, further including connecting a third dock to the first dock, wherein the third dock is connected to a fourth dock in a second vertical column, the first dock connected to the second dock being a first vertical column, with the host device being able to access content from portable hard disks connected to the third dock and the fourth dock.

\* \* \* \* \*